June 24, 1924.
J. C. REID, JR
BELT CONVEYER
Filed April 6, 1923
1,499,319
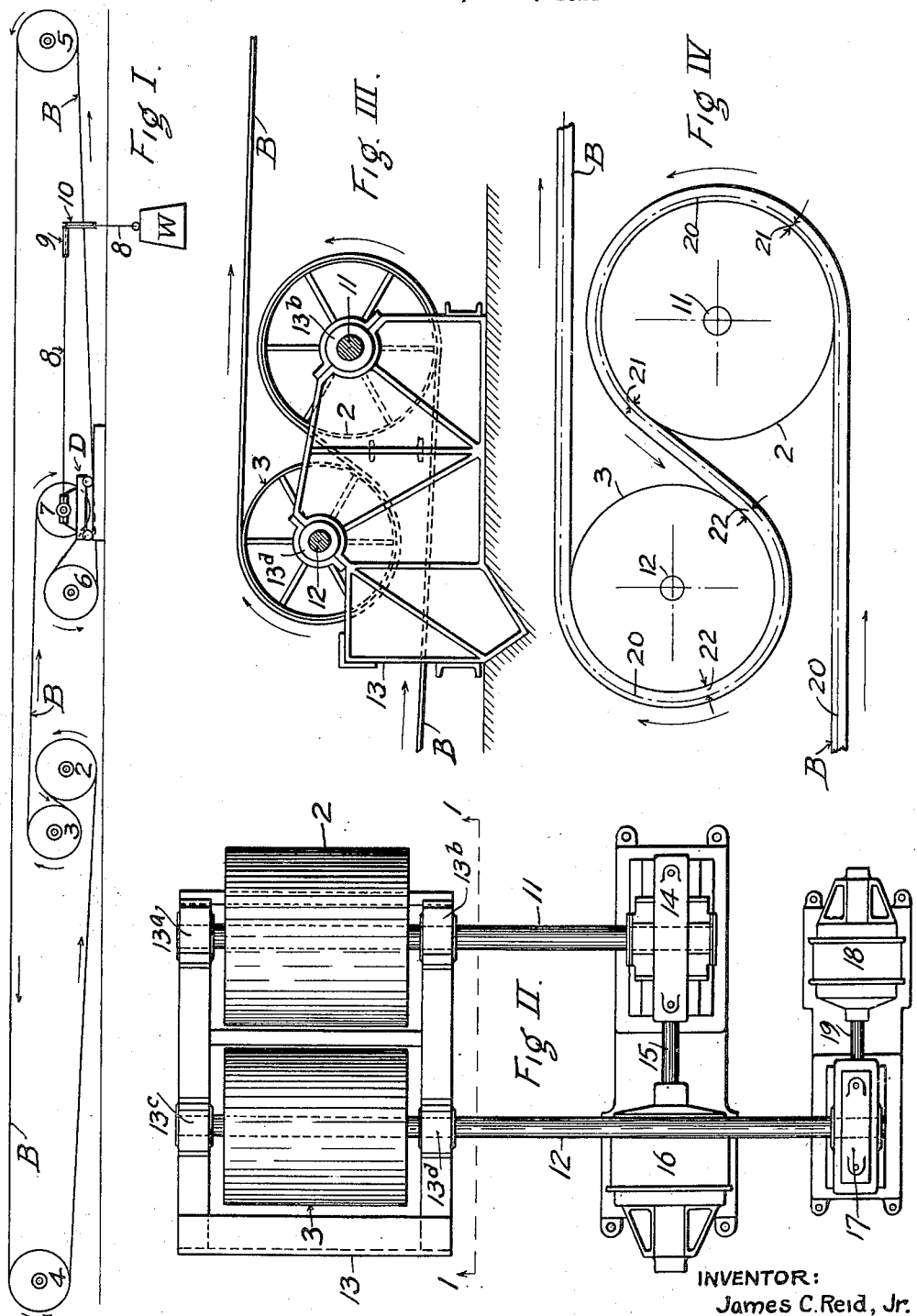
INVENTOR:
James C. Reid, Jr.
BY George C. Wing
His Attorney.
WITNESS:

Patented June 24, 1924.

1,499,319

UNITED STATES PATENT OFFICE.

JAMES C. REID, JR., OF CLEVELAND, OHIO, ASSIGNOR TO THE BROWN HOISTING MACHINERY COMPANY, OF CLEVELAND, OHIO, A CORPORATION.

BELT CONVEYER.

Application filed April 6, 1923. Serial No. 630,219.

*To all whom it may concern:*

Be it known that I, JAMES C. REID, Jr., a citizen of the United States, residing in the city of Cleveland, county of Cuyahoga, and State of Ohio, have invented a new and useful Improvement in Belt Conveyers, of which the following is a full, clear, and exact description, reference being made to the accompanying drawings, which form part of the specification, and wherein the same parts are designated by like numerals in each case.

My invention relates more particularly to that class of continuous motion belt conveyers which are called on to carry heavy loads and which, in order to secure the requisite traction, employ a plurality of driving or belt propelling pulleys arranged in what is known as a tandem or multiple series drive.

In such arrangement the practice hitherto has been to have a primary driving pulley operatively related to a source of power by shafting, or otherwise, and a secondary pulley of the same diameter as the primary pulley in close alignment therewith and geared to be driven at the same speed and in unison with the main pulley. The pulleys are so related as to rotate in opposite directions with respect to each other, and, at a point intermediate of the ends of the belt circuit, the lower run is passed around the same in the direction of their respective rotations.

In this manner a maximum of superficial contact and a certain degree of frictional resistance between the belt and the driving elements, referred to, are gained that contribute to the efficiency of the arrangement, but, from the nature of things, there are certain conditions and requirements of the use for which the arrangement is intended that are not taken into account and provided for by the same.

It is obvious, for instance, that a secondary belt-wheel as in the arrangement just referred to, having the same diameter and gauged speed as the primary driver, cannot function as an auxiliary driver at all, but, as to its companion pulley, can only serve to receive and pay off the precise length of belt that is received and paid off from the main driving pulley. It follows that, other things being equal, any slack in the belt portion between the two pulleys will not be taken up by the secondary pulley but will continue as a detrimental feature through the conveying operation. Also, when the belt itself, as is customary, is made up of a composite of fabric plies cemented together and coated on both sides with rubber, a special difficulty occurs in the use of a secondary pulley of the same diameter and speed as the primary pulley with which it is allied. In these belts the side, or face, that is to carry the material is given a thicker layer of rubber than the side that has no work to perform, which brings the neutral plane in bending, off the true center. In consequence, in any compound, S, or reverse bending of the belt, as in the tandem arrangements under consideration, the radii to the neutral plane is not the same in the two pulleys. When, therefore, under such circumstances, the neutral plane is nearer to the face of the primary pulley than to the secondary, the former will not propel and pay out the belt to the capacity of the secondary pulley, and the secondary pulley will tend to propel the belt faster than the former. As such acceleration is impossible because the rates of rotation of the pulleys are the same and fixed, the belt is subjected to undesirable strain and wear. On the other hand, when the neutral plane is nearer the face of the secondary pulley, the secondary pulley will receive from the primary pulley a greater amount of belt than its capacity, and "jumps" of the belt around both pulleys will be caused, that produce a jerky and undulatory motion of the same and unduly strain the belt lacings and fastenings.

The principal object of my invention is to provide a multiple drive of the class in question which, among other things, will be free from the objections recited, and, from the principle of its construction will insure at all times, during its operation, an even and uniform movement of the belt itself.

In the drawing Fig. I is a diagrammatic arrangement of a conveyer belt when equipped with my multiple drive, Fig. II is a plan view of the power units and their driving pulleys, Fig. III is a sectional view on the line 1, 1 of Fig. II and Fig. IV is a view showing the relative positions of the neutral plane of the belt with the peripheries of the driving pulleys when the belt describes an S curve.

In the diagrammatic belt system shown in Fig. I, 2 in a primary driving pulley and 3 is a secondary or auxiliary driving pulley.

4 and 5 are idler pulleys at the ends of the belt system.

A belt tightening device D, comprising a fixed idler pulley 6 and a movable tightening pulley 7, is preferably shown between the primary driving pulley 2 and the idler pulley 5.

A rope 8 fastened at its one end to the support for the movable pulley 7 passes over sheaves 9 and 10 and has a suspended counter-weight W fastened to its other end.

A belt B, starting at the underside of the primary pulley 2, is led around that pulley to the underside of the auxiliary pulley 3 then around the same, leading off the top to the top of the tightening pulley 7, thence around the same to the top of the idler pulley 6, around the latter pulley and from the bottom thereof to the underside of the idler pulley 5, where it passes around the same and leads off the top to the top of the idler pulley 4 at the other end of the system; after passing around the idler pulley 4 the belt leads off the bottom of that pulley to the underside of the primary pulley 2 where its ends are fastened or laced together, forming a continuous belt.

The primary driving pulley 2 is mounted on and keyed to a shaft 11 near its one end. The auxiliary driving pulley 3 is similarly mounted on a shaft 12. A U-shaped pulley support 13 provided with journal-bearings 13$^a$, 13$^b$ and 13$^c$, 13$^d$ supports the shafts 11 and 12. The shaft 11 rests in the bearings 13$^a$, 13$^b$ and the shaft 12 rests in the bearings 13$^c$, 13$^d$.

The shaft 11 extends outwardly from the bearing 13$^b$ to a suitable distance to engage a worm-gear in a gear-case 14. The worm-gear is keyed to the shaft 11. Extending from the gear-case 14, and, at right-angles to the shaft 11, is a motor shaft 15. The gear-case end of the motor shaft 15 is equipped with a worm that meshes with the worm-gear. The worm is keyed to the motor shaft and is driven by a motor 16 through the medium of the shaft 15.

The shaft 12 like the shaft 11 extends outwardly from the bearing 13$^d$ to a gear-case 17 and is driven by a motor 18 through the medium of a motor shaft 19 and a worm and gear reduction, not shown.

20 is the neutral plane of the driving belt B.

The distances represented by 21 and 22, respectively, show the relative positions the neutral plane of the belt has with the peripheries of two driving elements when the belt describes an S bend or curve.

From the foregoing description and specifications the operation of a conveyer belt system when made according to my invention will be apparent to those who are familiar with belt drives and the functioning of electric motors. The size of the primary power unit is optional, within certain limits, with the engineer and that of the auxiliary power unit takes into account the difference between the calculated horsepower, necessary to drive the conveyer belt, and the horsepower of the primary unit; it may be a relatively small unit, for it has little work to perform. Any over-load on the primary driver will be taken care of automatically by the secondary or auxiliary driver, and, should the auxiliary power unit receive an excess load in this manner from the primary unit, the latter will speed up, as soon as relieved of such excess, until the load on the two units will equalize and a positive and even action of the belt be maintained.

What I claim and wish to protect by Letters Patent, is:

A continuous motion belt conveyer system comprising the combination of a pair of driving pulleys fixedly mounted, in series, within and intermediate of the terminals of the belt circuit, upon oppositely turnable shafts, in each case, the said shafts being operatively connected to electric motors provided for the purpose, and the lower run of the belt circuit being passed upwardly around the foremost member of the pair in the direction of the motion of said run, and thence backwardly beneath and around the other member to its normal direction, all substantially as shown and described.

In witness whereof I have hereunto subscribed my name at Cleveland, Ohio, on this 30th day of March, 1923.

JAMES C. REID, Jr.

Witnesses:
L. P. LIPPS,
E. P. SAWHILL.